UNITED STATES PATENT OFFICE 2,533,328

LUBRICANT COOLANT SOLUTION

Thomas T. Rodgers, Milwaukee, Wis.; Thomas T. Rodgers, Jr., executor of said Thomas T. Rodgers, deceased, assignor to Janet W. Rodgers, Milwaukee, Wis.

No Drawing. Application August 27, 1945, Serial No. 613,019

2 Claims. (Cl. 252—49.3)

This invention relates to aqueous solutions, as distinguished from emulsions, suitable for lubricants or coolants or both. The composition of this invention is of particular utility when used as a cutting lubricant and coolant although other uses where lubricity in an aqueous solution is advantageous are of importance.

An object of this invention is to provide a composition which may be caused to flow onto the tool and work during machining and metal cutting operations, which composition will have the high thermal capacity and high thermal conductivity characteristic of water compositions free of emulsified oil but which, nevertheless, possesses a high degree of lubricity under extreme pressure conditions, and further, to provide such a composition in a form which may be diluted to any degree which the work may require with hard water from ordinary supply without deleterious interaction with hardness elements contained in such water.

Heretofore there has been available as described in my co-pending application Serial No. 482,114 for Aqueous Lubricant, filed April 7, 1943, now Patent No. 2,474,325, issued June 28, 1949, compositions of the aqueous solution type, as distinguished from emulsions, which posses high lubricity and exceptionally high cooling properties. The marked advantages of such compositions have rendered the same highly useful but the more effective of the same, and those preferred by reason of availability and low cost of constituent ingredients, suffer the disadvantage that when diluted as intended in normal usage with hard water they form undesirable gummy precipitates which adhere to the work and the machinery with which they are employed and which deprive the composition in part of its essential lubricity. The composition of this invention, on the other hand, is composed of plentifully available low cost ingredients and while preserving all of the advantages of the compositions heretofore known, possesses the distinctly advantageous property of not forming insoluble products by interaction with the ordinary water hardness elements.

The composition of this invention consists of a lubricant coolant solution in water of a substance formed by chemical reaction between a substituted paraffin hydrocarbon containing from 10–30 carbon atoms and in which more than one hydrogen atom has been replaced by a halogen, and a polyamine containing two or more and preferably not over six nitrogen groups of which at least two are primary amine groups. Preferably, the halogenated hydrocarbon and polyamine substances are caused to react with one another in roughly equi-molar proportions by simply mixing such substances and maintaining the reacting mixture at an appropriate temperature until the reaction is substantially complete. The reaction may be carried forward under any suitable pressure having regard for the volatility of the reacting ingredients and products formed. In many cases it is possible to carry forward the reaction at atmospheric pressure, but in some cases where the substances involved are excessively volatile at the temperatures required, pressure in excess of atmospheric pressure may be advantageously resorted to.

The general character of the reaction which takes place appears to consist of the combining of one terminal primary amine group with a carbon atom of the hydrocarbon chain to which a halogen atom is attached. As a result, elimination of halogen acid occurs which, being set free, then reacts with the second terminal primary amine group to form a hydro-halogen linkage therewith. The course by which the bulk of the reaction product arrives in the condition indicated cannot be described in detail, but the reaction after progressing actively for a time ceases and a comparatively stable reaction product which is believed to have the indicated structure results. The reaction product formed in this manner is substantially completely soluble in water and a comparatively small amount of water is sufficient to dissolve a comparatively large amount of such product. Weak to moderately strong solutions thereof, say from $\frac{1}{20}\%$ to $20\%$ by weight in water, have distinctly valuable properties when used as a cutting coolant, the very weakest of said solutions being best adapted for grinding coolants. The lubricity of more concentrated solutions, say from $20\%$ to $90\%$ by weight of reaction product and the rest water, still is very pronounced but for obvious reasons of cost such concentrated solutions will find little direct application, although at times concentrations of from $\frac{1}{20}\%$ to $50\%$ by weight of the reaction product in water may be used as a lubricant and coolant. For purposes of packaging, shipment and distribution, however, the concentrated solutions are highly useful, since such concentrates may be handled with ease and then diluted with ordinary water supply available at the point of use.

The reacting ingredients and the product formed thereby are defined by the following general equation:

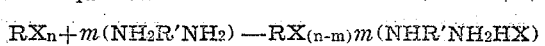

where, X=halogen, R=carbon hydrogen structure of paraffin, $n$=number of halogens greater than one, $m$=any number less than $n$, R′=any structure to which at least two primary amine groups are attached.

A large number of substances come within the general class as above defined and by way of illustrative instances thereof the following examples are given.

Example 1

100 grams of chlor paraffin consisting of a commercial mixture of substances having the approximate average formula of $C_{24}H_{45}CL_5$ may be mixed with 40 grams of tetra ethylene pentamine and heated at atmospheric pressure to a temperature maintained between 100–150° Cent. for upwards of one-half hour. Upon permitting the resulting product to cool, the above reaction product may then be placed in water solution in ordinary commercial water supply in approximate proportions by weight of 50 parts of water and 50 parts of reaction product to form a concentrate intended to be diluted on usage. A completely homogeneous solution will result without formation of any apparent precipitate or undissolved residue.

A concentrate, as above prepared, when diluted with 10 volumes of ordinary tap water and tested in accordance with the standard "Falex" test may be expected to yield the following results:

Shear, 4400 lb.
Torque, 70 lb.
Corrosion, none
Foam, 0 after 10 min.
Wear, 127 at 1500 lb. load The above test results indicate a high degree of lubricity particularly under extreme pressure conditions. The composition thus prepared when applied to the tool and work in an ordinary machining operation may be expected to permit a high rate of removal of heat and an exceptionally high rate of metal removal while at the same time exercising sufficient lubricating effect to produce a finish on the work of superior character considering the rate of machining maintained. Another important advantage of the properties of this composition when thus employed is that tool life is greatly extended. If desired, a substantial proportion of excess or uncombined polyamine may be retained in the composition. While the composition diluted as described for the test contained about 5% of reaction product, other dilutions of from 1/20% to 20% will be found useful for coolant-lubricant purposes.

Other halogen substituted paraffin hydrocarbons may be employed in whole or in part, alone or in mixtures, in the place of those specifically mentioned as long as they come within the general definition of $CnH_{(2n+2-Q)}X_Q$ where C is carbon, H is hydrogen, $n$ is a number between 10 and 30, Q is a number from 2 to 20 and X is a halogen.

To name but a few of these specifically, there are di, tri, tetra, penta, hexa, octa and deca; chlor, brom, iodo and fluoro; dodecane, pentadecane, eicosane, heneicosane, docosane, tricosane, tetracosane, pentacosane, hexacosane, nonacosane, melissane or their isomers and mixtures of the same.

Following the general procedure as outlined above, reaction products may be formed using approximately equi-molar proportions of the chlor paraffin above named and triethylene tetra amine, diethylene triamine or ethylene diamine in whole or in part for tetra-ethylene pentamine. Pentaethylene hexamine also may be employed but to a certain extent the advantageous characteristics of this invention are substantially diminished in this case although still present to a substantial extent. Amines of greater complexity may to some extent be useful. Here again, if desired, an excess of the polyamine may be employed.

Example 2

100 grams of brom paraffin having the approximate composition of $C_{15}H_{29}Br_3$ may be mixed with 33 grams of triethylene tetra amine and the mixture subjected to heating at 100–150° Cent. for upwards of one-half hour. There will be formed a reaction product apparently completely soluble in hard water. Dilution with water to the same extent as in Example 1 will form solutions of high lubricity. The other amines mentioned in Example 1 may be substituted in whole or in part for the triethylene tetra amine.

The substances formed in accordance with this invention may be chemically modified without depriving them of their major characteristics for the purpose intended by introduction of other radicals into the molecular structure. For this purpose, sulphur or sulphur containing radicals, nitrogen, hydroxyl, aldehyde, ketone and other well-known modifying radicals may be resorted to to influence the stability, effect upon corrosion, surface or other properties or lubricity of the finished composition.

The amount of halogen contained in the paraffin molecule may vary within wide limits but I have found the preferable range to be from 35% to 70% halogen by weight in the molecule. Within this range the substances containing from 40% to 43% halogen are usually the most desirable both from the standpoint of the ease of the formation of the same and from the standpoint of the performance of compositions made therefrom as coolant lubricant compositions.

I claim:

1. A lubricant coolant solution consisting of from 2/10% to 50% by weight of a substance defined by the formula

$$RX_{(n-m)}m(NHR'NH_2HX)$$

wherein R represents carbon hydrogen structure of paraffin, X represents halogen, $n$ a number of halogen atoms greater than one, $m$ represents a number less than $n$, and R' an alkylene polyamine having at least two primary amine groups, said substance being contained in solution in water.

2. A concentrate adapted to be diluted with water to form a lubricant coolant solution consisting of at least 50% by weight of a substance defined by the formula

$$RX_{(n-m)}m(NHR'NH_2HX)$$

wherein R represents carbon hydrogen structure of paraffin, X represents halogen, $n$ a number of halogen atoms greater than one, $m$ represents a number less than $n$, and R' an alkylene polyamine having at least two primary amine groups, said substance being contained in solution in water.

THOMAS T. RODGERS.

REFERENCES CITED

The following references are of record in the file of this patent:

UNITED STATES PATENTS

| Number | Name | Date |
| --- | --- | --- |
| 2,223,129 | Prutton | Nov. 26, 1940 |
| 2,214,352 | Schoeller et al. | Sept. 10, 1940 |
| 2,242,223 | Bley | May 20, 1941 |
| 2,244,712 | Kyrides | June 10, 1941 |
| 2,267,204 | Kyrides | Dec. 23, 1941 |
| 2,276,309 | Hummel et al. | Mar. 17, 1942 |
| 2,344,016 | Anderson | Mar. 14, 1944 |
| 2,448,910 | Reamer | Sept. 7, 1948 |